F. B. Wells.
Book-Binding.
No. 3,347. Reissued Mar. 30, 1869.
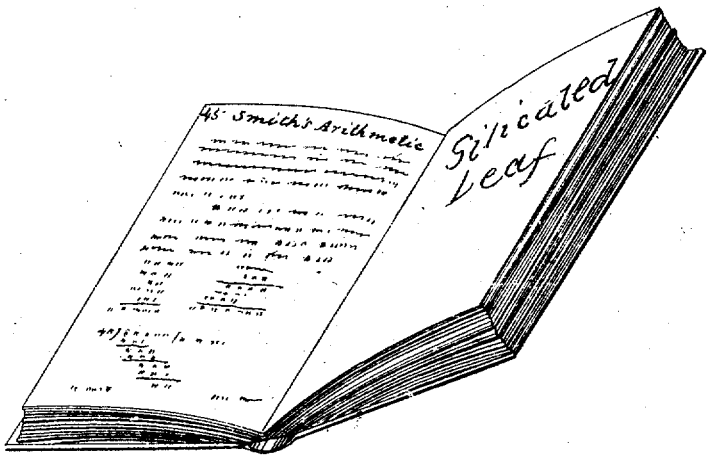
Witnesses
A. M. Farmer
C. A. Pettit
Inventor
F. B. Wells
by Munn & Co.
Attorneys

UNITED STATES PATENT OFFICE.

FRANK B. WELLS AND J. HERVEY COOK, OF FISHKILL ON THE HUDSON, NEW YORK; SAID WELLS ASSIGNOR OF ONE-HALF TO SAID COOK.

IMPROVEMENT IN BINDING BOOKS.

Specification forming part of Letters Patent No. 83,345, dated October 20, 1868; Reissue No. 3,347, dated March 30, 1869.

*To all whom it may concern:*

Be it known that FRANK B. WELLS, of Fishkill on the Hudson, in the county of Dutchess and State of New York, did invent a new and useful Improvement in Mathematical and other Books; and we, FRANK B. WELLS, aforesaid, for himself, and J. HERVEY COOK, of Fishkill on the Hudson, Dutchess county, New York, assignee of one-half of said invention, do hereby declare that the following is a full, clear, and exact description thereof, which will enable others skilled in the art to make and use the same.

The nature of this invention relates to improvements in mathematical and other books, the object of which is to provide such books with leaves or sheets of silicated paper for convenience in working out examples, the said silcated leaves or sheets being adapted for use as slates; and it consists in combining the said silicated leaves with the said books, either by binding them together with the leaves of the book, pasting, or otherwise securing them to the surface of blank leaves or to the covers, or in any preferred manner of accomplishing the same.

In the accompanying drawing the figure is a perspective view of a book having the invention applied thereto.

We take silicated leaves, preferably prepared only on one side, fold them so that the prepared surfaces come together, and lay them between the leaves of the book at convenient intervals apart, so that they may be bound or otherwise fastened in with the leaves of the book or to the same or to the cover, thus constituting an essential portion thereof, upon which any penciling or writing may be done, thus combining slate and arithmetic, grammar and blackboard, &c. These leaves are prepared only on one side, in order, first, that they may be the more pliable as leaves, and, second, that in cleaning them the dampness will not come in contact with the printed portions of the book, so that the adjoining leaves will not be affected with dampness, nor become soiled when the book is closed; but the said leaves may be prepared on both sides, if preferred.

Having thus described the invention, we claim as new and desire to secure by Letters Patent—

Mathematical and other books provided with silicated leaves or sheets combined therewith, substantially as and for the purpose specified.

FRANK B. WELLS.
J. HERVEY COOK.

Witnesses:
ISAAC M. VAN WAGNER,
FRED VAN VOORHIS.